United States Patent [19]

Kohashi et al.

[11] Patent Number: 4,819,010

[45] Date of Patent: Apr. 4, 1989

[54] THERMAL PRINTER USING A THERMALLY TRANSFERABLE INK SHEET

[75] Inventors: Tadao Kohashi; Hiroshi Onishi; Hiroshi Esaki, all of Osaka, Japan

[73] Assignee: Matsushita Electric Industrial Co., Ltd., Japan

[21] Appl. No.: 64,249

[22] Filed: Jun. 19, 1987

Related U.S. Application Data

[62] Division of Ser. No. 738,756, May 29, 1985, abandoned.

[30] Foreign Application Priority Data

| | | | |
|---|---|---|---|
| May 30, 1984 | [JP] | Japan | 59-110023 |
| Oct. 29, 1984 | [JP] | Japan | 59-227155 |
| Nov. 22, 1984 | [JP] | Japan | 59-247303 |
| Nov. 22, 1984 | [JP] | Japan | 59-247332 |
| Dec. 10, 1984 | [JP] | Japan | 59-260281 |

[51] Int. Cl.[4] .............................................. G01D 15/10

[52] U.S. Cl. ............................ 346/76 PH; 346/76 R; 400/120

[58] Field of Search ................. 346/76 PH, 1.1, 76 R; 219/216, 216 PH; 200/120, 120 PH

[56] References Cited

U.S. PATENT DOCUMENTS

| | | | |
|---|---|---|---|
| 2,890,969 | 6/1959 | Schossberger et al. . | |
| 3,347,696 | 10/1967 | Newman . | |
| 4,113,391 | 9/1978 | Minowa . | |
| 4,350,449 | 9/1982 | Countryman et al. . | |
| 4,374,385 | 2/1983 | Yoshizaki et al. . | |
| 4,451,834 | 5/1984 | Nakajima et al. . | |
| 4,517,591 | 5/1985 | Nagashima et al. | 346/76 PH |
| 4,541,830 | 9/1985 | Hotta et al. . | |

FOREIGN PATENT DOCUMENTS

| | | |
|---|---|---|
| 0109295 | 5/1984 | European Pat. Off. . |
| 1302853 | 8/1971 | Fed. Rep. of Germany . |
| 56-27394 | 3/1981 | Japan . |
| 56-126194 | 10/1981 | Japan . |
| 57-36698 | 2/1982 | Japan . |
| 57-105369 | 6/1982 | Japan . |
| 57-138984 | 8/1982 | Japan . |
| 58-116193 | 7/1983 | Japan . |
| 59-64367 | 4/1984 | Japan . |
| 0101398 | 6/1984 | Japan . |
| 2100673 | 1/1983 | United Kingdom . |

OTHER PUBLICATIONS

Patents Abstracts of Japan, vol. 10, No. 92, (M-468) (2149), Apr. 9, 1986 & JP-A-69 229 790 (Matsushita Denki Sangyo K.K.) 15-11-1985.

Patents Abstracts of Japan, vol. 10, No. 92, (M-468) (2149) Apr. 9, 1986 & JP-A-60 229 789 (Matsushita Denki Sangyo K.K.) 15-11-1985.

Patents Abstracts of Japan, vol. 10, No. 92, (M-468) (2149), Apr. 9, 1986 & JP-A-60 229 793 (Matsushita Denki Sangyo K.K.) 15-11-1985.

Patents Abstracts of Japan, vol. 10, No. 92, (M-468) (2149), Apr. 9, 1986 & JP-A-60 229 795 (Matsushita Denki Sangyo K.K.) 14-11-1985.

Patents Abstracts of Japan, vol. 10, No. 88, (M-467) (2145), Apr. 5, 1986 & JP-A-60 225 797 (Matsushita Denki Sangyo K.K.) 11-11-1985.

Patents Abstracts of Japan, vol. 8, No. 262, (M-341) (1699), Nov. 30, 1984 & JP-A-59 133 098 (Matsushita Denki Sangyo K.K.) 31-07-1984.

Patents Abstracts of Japan, vol. 8, No. 258, (M-340) (1695), Nov. 27, 1984 & JP-A-59 131 495 (Matsushita Denki Sangyo K.K.) 28-07-1984.

*Primary Examiner*—Elliot Goldberg

*Assistant Examiner*—Huan H. Tran

*Attorney, Agent, or Firm*—Lowe, Price, LeBlanc, Becker & Shur

[57] ABSTRACT

A thermal printer which uses a thermally transferably ink sheet having an irregular surface comprises heating means for generating heat in response to an input signal applied thereto; first support means for movably supporting a recording sheet and providing a pressure on the recording sheet in a direction toward the heating means; second support means for movably supporting a thermal transfer sheet in contact with the heating means, the thermal transfer sheet comprising a heat resistive base and a thermally transferably ink layer on one side of the base, the layer comprising a mixture of a coloring agent and a hot melt binder, the mixture being transferably to the recording sheet in response to application of heat to the other side of the base, and auxiliary particles distributed in the layer so that they partially emerge from the surface of the layer; means for moving the first and second supporting means; and means located down stream with respect to the heating means for separating the transfer and recording sheets from each other before the heat mixture solidifies.

11 Claims, 8 Drawing Sheets

THERMAL PRINTER USING A THERMALLY TRANSFERABLE INK SHEET

This is a division of application Ser. No. 738,756, filed 5-27-85 now abandoned.

BACKGROUND OF THE INVENTION

The present invention relates to a thermal transfer sheet capable of providing monochromatic or full-color continuous tone rendition using a thermal print head or the like and a method for fabricating the transfer sheet.

Prior art thermal transfer sheets comprise a heat resistive base composed of a condenser paper or polyethylene terephthalate (PET) film and a layer of thermally transferable ink deposited on one surface of the base. The thermally transferable ink is a mixture of a hot melt binder and pigment. A thermal head scans the transfer sheet to successively heat elemental areas of the ink layer to render them transferable to a recording sheet. For ink transfer to occur it is necessary that the heat applied to each elemental area penetrate the full thickness of the ink layer. The melted ink on each elemental area is transferred in one lump to the recording sheet. Thus, the printed ink dot represents one of two discrete tone values. Although satisfactory for printing documents, the prior art transfer sheet is disadvantageous for continuous tone rendition.

One possible solution would be to use digital density shading techniques such as the dot-pattern method. However, the digital techniques reduce image resolution and require complex circuitry.

SUMMARY OF THE INVENTION

It is therefore an object of the present invention to provide a thermal transfer sheet capable of continuous tone rendition.

The thermal transfer sheet of the invention comprises a heat resistive base, a thermally transferable ink layer on one side of the base, and auxiliary particles distributed in the layer so that they partially emerge from the surface of the layer to present an irregular surface. The transferable ink layer comprises a mixture of a coloring agent and a hot melt binder, the mixture being transferable to a writing surface in response to application of heat to the other side of the base.

For a wide range of applications, the particles can be made to possess desired physical properties in relation to the ink material. In one aspect of the invention, the particles are capable of acting as a conductor of heat to adjacent ink portions to cause them to melt earlier than other portions of ink, providing a passage for other portions of melted ink to permeate therethrough to the writing surface. In another aspect of the invention, the particles are transferable with the melted ink to the writing surface to serve as an ink carrier and a spacer between the transfer sheet and the writing surface. In a further aspect, the particles are rendered untransferable to the writing surface but capable of acting as a heat conductor. In a still further aspect, the particles are rendered fusable when the particles are heated to a temperature higher than the temperature at which the binder becomes transferable.

The presence of the auxiliary particles in the thermally transferable ink layer enables ink dots to be modulated in quantity as a function of the amount of heat applied to each elemental area.

BRIEF DESCRIPTION OF THE DRAWINGS

The present invention will be described in further detail with reference to the accompanying drawings, in which.

DETAILED DESCRIPTION

Figure 1:
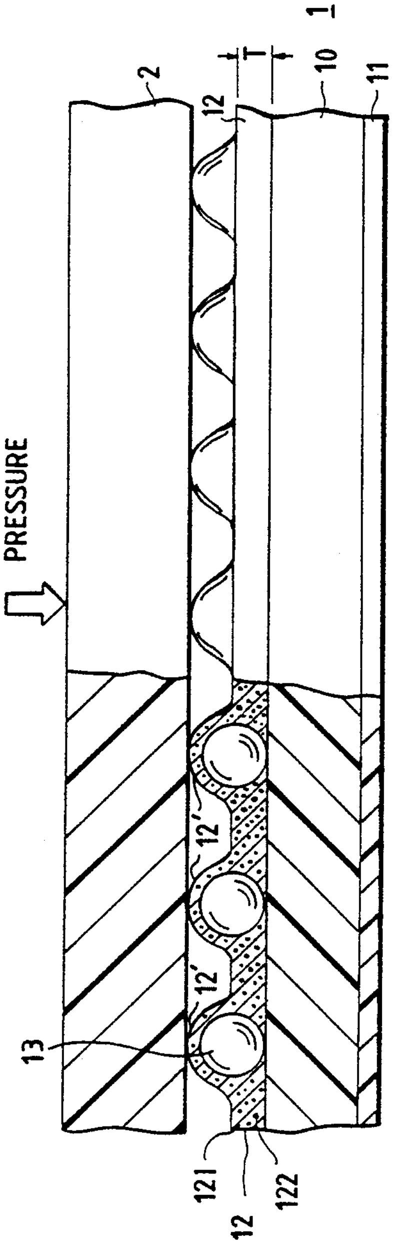
FIG. 1 is an illustration of a first embodiment of the thermal transfer sheet of the invention in which auxiliary particles serve as heat conductors to enable ink to permeate in the direction of thickness of the ink layer.

Referring to FIG. 1, there is shown a thermal transfer sheet of a first embodiment of the invention. The transfer sheet 1 comprises a heat resistive base 10 and a transfer ink layer 12 of a thermally transferable mixture of a hot melt binder and a coloring agent deposited on base 10. Thermal transfer auxiliary particles 13 are uniformly dispersed in layer 12. At least one such particle exists in an elemental picture area which will be produced on a recording sheet 2 by a thermal head. Particles 13 are preferably round and have a size greater than the thickness T of layer 12, so they are partially embedded in layer 12 and partially emerge from the surface of the layer to present an uneven surface to the recording sheet 2 with which the transfer sheet 1 is in pressure contact during the printing operation.

To provide small friction contact between the thermal head and transfer sheet 1 and to improve the heat resistivity of the base 10, a heat-resistive, low-friction layer 11 is formed on the side of base 10 remote from layer 12. The low-friction layer 11 is composed, for example, of a mixture of heat-resistive resin such as polysulfone resin and inorganic high-melting point fine powder such as silica.

The ink layer 12 is composed of hot melt binder 121 and coloring agent 122 such as pigment or dyestuff. The binder is a thermally meltable material which normally remains in a high viscous, or solid state and changes to a low viscous, or thermally transferable state in response to application of heat to base 10. Particles 13 are composed of a material which remains solid at temperatures at which the hot melt binder changes to the thermally transferable state.

Assume that heat is applied from the thermal head to an elemental area of base 10 for a short period of time, the binder becomes transferable in a lower portion of layer 12 immediately above the heated area. If heat is further applied to that area, particles 13 adjacent the transferable portion are heated, so that their temperature will rise above the transferable temperature of the binder. Thin layers of ink that overlie the emerging portions of the hot particles and underlie the submerged portions are thus heated and the binder contained therein changes to transferable state. The amount of heat supplied to the surrounding thin layers can be increased if the thermal conductivity of particles 13 is higher than the thermal conductivity of the binder insofar as the thermal capacity and hence the particle size is not excessively greater than the thickness T of layer 12. The overlying ink layers 12' are transferred to the recording sheet 2. This transfer action is enhanced by capillary action that occurs in the contact area between recording sheet 2 and particles 13. The transfer action can further be enhanced if the recording sheet 2 is formed of a porous, ink absorptive material.

Ink layer 12 sharply expands in volume according to the volume expansion coefficient of the binder as it changes to the transferable state. As will be discussed in detail later, materials such as wax having a volume expansion coefficient of 20% or higher at the transition from solid to liquid phase can be used advantageously. To take advantage of the volume expansion, pressure is applied to the recording sheet to cause a volume-expanded melt to rapidly move upwards to the recording sheet in response to the application of heat.

Figure 2:
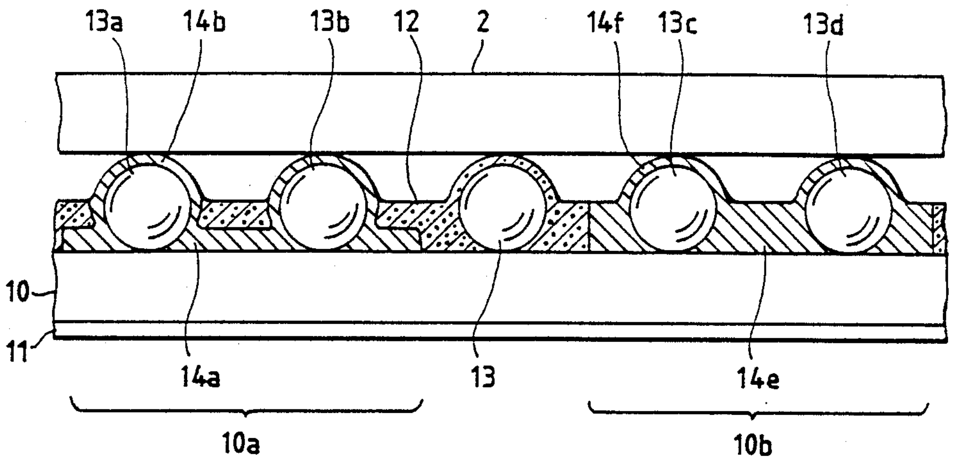
FIGS. 2 and 3 are illustrations useful for describing the operating principle of the first embodiment.
Figure 3:
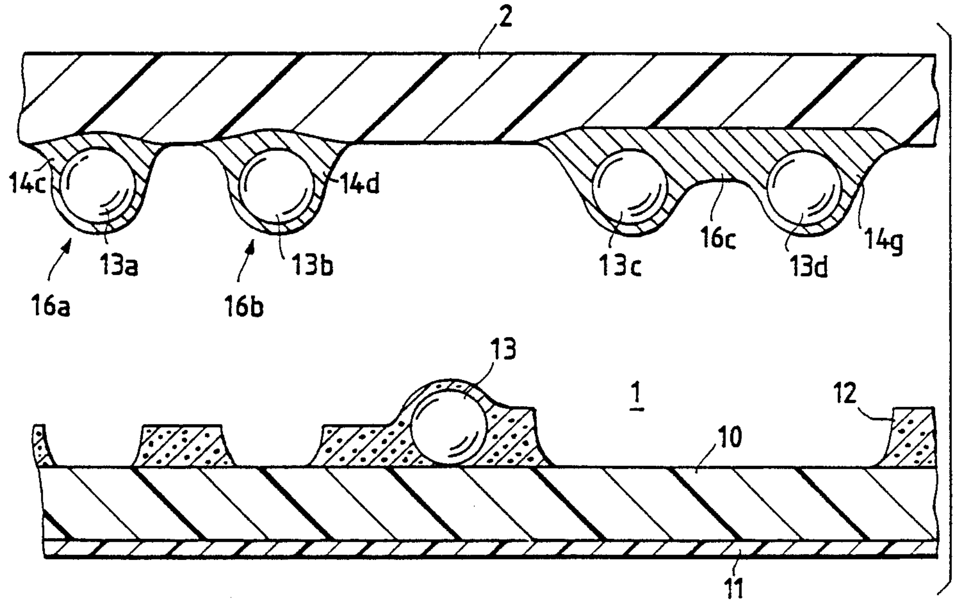

More specifically, if an elemental area 10a on base 10, FIG. 2, is heated to a relatively low temperature, a lower portion 14a of layer 12 and thin layers 14b of ink that surround particles 13a and 13b are melted. Under pressure applied to recording sheet 2, the volume expanded melt is forced upward along the surfaces of the hot particles 13a, 13b and transferred to sheet 2. If the recording sheet is separated from the transfer sheet before the melt solidifies, particles 13a, 13b are dislocated from base 10 and transferred to the recording sheet with melts 14c, 14d as shown in FIG. 3, producing ink dots 16a, 16b which form a picture element of low optical density.

If an elemental area 10b of the base is heated to a relatively high temperature, fusion develops upwards throughout the thickness of the ink layer 12 producing a melt 14e and thin layered melt 14f overlying the emerging portions of particles 13c and 13d. As a result, particles 13c and 13d are dislocated from base 10 with a melt 14g, FIG. 3, producing a dot 16c of highest density if sheet 2 is likewise separated from sheet 1 before melt 14g solidifies.

It is seen that the number of ink dots produced on each elemental area is proportional to the applied heat insofar as its energy is relatively low and that the area of ink dots is also proportional to the applied heat if its energy is relatively high. Therefore, the optical density of the elemental picture is proportional to a wide range of thermal energies applied to the transfer sheet.

The above description applies not only to the use of binder materials having a single value of melting point but to the use of organic materials or waxes which are mixtures of different components having different melting or softening points with a resultant loss of sharpness in the reduction of viscosity. If binder materials have no definite melting point, a softening, pour point or dropping point may serve as a determining factor of the thermally transferable temperature of the binder material, and if these determining factors are not available, the decomposition or sublimation temperature can be used. Particles 13 have a higher temperature of either melting, softening, pour point or dropping point than the thermally transferable temperature of the binder. As will be described later, materials having a high degree of penetration or materials which are normally solid or semi-solid may also be used as the binder. Such low viscosity material as polybutene can also be used as the binder if it has a viscosity greater than $2\times10^4$ centipoises at room temperature (25° C.), preferably higher than $5\times10^4$ centipoises, with the density of particles 13 dispersed at a relatively high density to prevent the binder from being adhered to recording sheet 2 when it is simply brought into contact in the absence of heat.

The binder material is selected so that the transfer layer 12, when melted, forms a wet angle of less than 90 degrees with respect to the surface of particles 13.

Particles 13 having sizes greater than the thickness T of layer 12 adopt a distribution curve. Since the amount of thermal energy each particle receives is proportional to the square of the particle diameter, while the thermal capacity of the particle is proportional to the cube of the particle diameter, the smaller the particle becomes, the shorter the time it takes to reach the necessary temperature. Thus, with smaller particles ink transfer occurs at lower energy levels while it occurs at higher energy levels with larger particles.

By appropriately distributing particles of different sizes they are made to respond respectively to different thermal energy levels, enabling the reproduction of the original having a subtle difference in shade over a wide range of density shadings. By controlling the particle size distribution it is also possible to compensate for the gamma characteristic of the transfer layer 12.

Particles 13 preferably have a round shape; the particle size is not required to be uniform insofar as it distributes in a prescribed range. In the latter case, the particles having a size greater than the thickness T of layer 12 contribute to the deposition of ink and those having smaller sizes behave in a manner similar to the coloring agent. In a practical aspect, average value can be conveniently used to represent the particle size.

The base 10 comprises 3.5- to 15-micrometer thick resinous film formed of polyethylene terephthalate, polyimide, cellophane, polycarbonate, triacetylcellulose or nylon. Otherwise, glassine paper, tracing paper or condenser paper may also be used as a material of base 10.

The binder material is preferably formed of hot melt which remains solid at room temperature. Such materials include carnauba wax, montan wax, acid wax, ester wax, candelilla wax, beeswax, paraffin, microcrystalline wax, or low molecular weight polyethlene, low molecular weight polystyrene, polystearic acid vinyl, petroleum resins, polyamide resins, alicyclic saturated hydrocarbon resins, rosin-modified maleic acid resins, ethylene vinyl acetate copolymer (EVA) resins, or a mixture of these materials. To ensure good transferability from the transfer sheet and adhesion to the recording sheet, the binder is required to have a melting (softening) point or pour point of 50° C. to 150° C., preferably in the range between 60° C. and 120° C. A softening agent such as polyvinyl acetate, cellulose ester group, acrylic resins, or stearic acid or lanolin may be added to the binder. If elastic binders such as petroleum resin and low molecular weight polystyrene are used, no softening agent is needed. Normally sticky materials such as polybutene, polyisobutylene, polybutadiene, silicone oil or mineral oil may be mixed with a hot melt material to obtain a desired thermal characteristic. The binder material capable of producing an excellent density shading is a mixture of an alicyclic saturated hydrocarbon resin having a softening point in the range between 70° C. and 125° C. (which is available under the trademark of Arakawa Chemical Industries Limited as ARCON P-70 and ARCON P-125) and solid paraffin and candelilla wax having a melting point of 66° C. to 71° C. As required, less than 5 percent by weight of fluoric surfactant (Fluorad 430 available from 3M) may be added to the alicyclic saturated hydrocarbon resinous binder just mentioned. By appropriately mixing the above-mentioned components, a binder having a softening point in the range between 60° C. and 120° C. can be obtained.

The coloring agent may comprise organic or inorganic pigments or dyes as used in printing ink and paints, or a mixture of these materials. A coloring agent having an excellent colorfast quality should contain pigment such as carbon black for black-and-white prints, and for full-color prints, it should contain phthalocyanin blue pigment (CI Pigment Blue 15) for cyan, naphthol AS-group monoazo pigment (CI Pigment Red 31) or carmine group pigment (CI Pigment Red 238, CI Pigment Red 57) for magenta, and chromphthal yellow pigment (CI Pigment Yellow 93) or condensed azoyellow pigment or disazo group yellow pigment (CI Pigment Yellow 12, CI Pigment Yellow 14, CI Pigment Yellow 17) for yellow.

Suitable dyes are CI Solvent Black 3 for black, CI Solvent Blue 25 for cyan, CI Solvent Red 49 for magenta, CI Solvent Yellow 16 for yellow. The pigments and dyes just mentioned are appropriately mixed to prepare three primary colors or four primary colors with additional black being added to the three primary colors. These coloring agents are mixed with binders to form thermal transfer ink layers of different primary colors successively on a single base web to permit reproduction of primary color images on a frame-by-frame basis.

Particles 13 may be composed of aluminum oxide which can be advantageously mixed with the transfer ink of the material composed of the above-mentioned alicyclic saturated hydrocarbon resinous binder and coloring agent. Transfer layers formed of such ink materials are arranged in the order of cyan, magenta and yellow or in the order of magenta, cyan and yellow. The color arrangement in the order of cyan, magenta and yellow ensures excellent full color rendition.

The coloring agent should be mixed with the binder in the range between 2 and 60 weight percents, preferably in the range between 10 and 50 weight percents. The latter range of values is preferred for pigment-containing ink of the material composed of a hydrocarbon resin binder to ensure a wide range of optical densities and excellent density shading.

The particles contained in the transfer layer can be composed of inorganic particles, polymer particles regardless of color, transparency and porosity. However, transparent or translucent types of materials are preferred to prevent it from affecting the color and density shading of transferred ink.

While metallic particles may be advantageously used to take advantage of the high thermal conductivity, nonmetallic particles can also be advantageously used under certain circumstances because of their nonoxidizability. Since inorganic materials have a specific heat of 0.1 to 0.2 cal/g.°C. which is lower than the specific heat of hot melt binders and a thermal conductivity of $2\times10^{-3}$ to $50\times10^{-3}$ cal/cm.sec.°C. which is higher than the thermal conductivity of the binders, aluminun oxide, glass, titanium oxide, silica, dissolvable quartz, stannic oxide, calcium carbonate and barium sulphate can also advantageously be used as transfer auxiliary particles 13. Because of their much higher melting (softening) point than the hot melt binders these inorganic particles remain solid in the melted binder which may reach 350° C. Thus, inorganic particles can act as a spacer to prevent sheets 1 and 2 from being strongly adhered to each other by the melted binder. The use of aluminum oxide is preferred because of its high thermal conductivity which is typically $5\times10^{-2}$ cal/cm.sec.°C.

Thermosetting and thermoplastic resins having a melting (softening) or pour point higher than 140° C. can also be used as particles 13 for binders having a corresponding temperature in a range between 60° C. and 120° C. Such resins include epoxy resins, phenol resins, benzoguanamine resin (which decomposes at 300° C. and is available under the trademark APOSTER of Nippon Shokubai Kagaku Kogyo Co. Ltd), ethylcellulose, polysulfone resin, and nylon-12 resin (which melts at a temperature in a range between 172° C. and 180° C. and is available under the trademark Diamide of Daicel Chemical Industries Limited), polyimide resin.

The above-mentioned organic and polymer particles are transparent, translucent or white.

If the binder material has a melting (softening) or pour point in the neighborhood of 60° C., organic particles such as rosin-modified maleic resin which melts at 90° C. and hot melt particles such as carnauba wax (melting point being 83° C.) and sasol wax (melting point being 108° C.). In the latter case, the hot melt does not completely dissolve mutually with the binder at normal temperature during the process of preparing the transfer layer and if liquid solvent is used for the preparation care should be taken to ensure that the hot melt and binder do not completely dissolve in the liquid solvent at room temperature. It is preferable that in the case of low-temperature binders the organic or hot melt particles be mutually dissolvable with the binder during the process of ink transfer since it improves the ink transferability and adherence to the recording sheet. Carnauba wax and sasol wax are suitable for applications in which a solvent coating method is employed to form a transfer layer 12 on base 10 since they are not dissolvable in liquid solvent at normal temperatures. Several kinds of hot melt may be mixed to prepare hot melt particles having a desired thermally transferable temperature.

In cases where colored materials are used for particles 13, suitable colored materials are such inorganic pigments as red iron oxide, such organic pigments as disazo yellow 10G having a large secondary particle size, dyelake particles such as acid dyelake, basic dyelake and acid azo dyelake, colored plastic particles and diatomaceous earth particles. If the colored particles have the same color as the coloring agent 122, an image of a high optical density can be obtained, and in this case the particles 13 can be composed of the same material as the coloring agent. If they differ from the coloring agent an image having differing shades of colors can be obtained depending on the thermal energy applied.

If the coloring agent is composed of a black dye or black pigment such as carbon black, the particles 13 can be composed of artificial graphite having a particle size greater than the particle size of the black pigment. Use of artificial graphite is of advantage to the invention because its high thermal conductivity (=0.03 cal/cm-.sec.°C.) and its substantially spherical shape.

The particle size tends to differ from one particle to another such that the number of each particle size adopts a certain distribution among which the particles having the maximum or near maximum size exceed the thickness T of the ink layer 12. Suitable values of the particle size are in the range between 1.5 and 40 micrometers, the preferred values being in the range between 2 and 15 micrometers.

To obtain satisfactory density shading it is preferable that particles 13 be distributed with a density that ranges from a minimum of $16/mm^2$ to a maximum of $5\times10^4/mm^2$ depending on the particle sizes referred to above and on the density of picture elements represented by dots per millimeter along a print line which ranges from 4 to 16. A density in the range between $3\times10^2/mm^2$ and $5\times10^4/mm^2$ is most preferred. With particles 13 being in the above-mentioned range of size, maximum density is obtained when they occupy an area which accounts for 78% ($=\pi/4$) of the total area of ink layer 12.

The specific weight of particles 13 is in the range between 0.9 and 4 grams/cm$^3$, while the specific weight of the binder and coloring agent combined is in the range between 0.9 and 2 grams/cm$^3$. The part-by-weight ratio of particles 13 to the mixture of hot melt binder 121 and coloring agent 122 is in the range between 2.5:100 and 230:100. To ensure satisfactory optical density and thermal transferability, the amount of thermal ink 12 and particles 13 combined is preferably between 0.5 and 6.5 grams/m$^2$. An excellent result can be obtained when (a) the maximum particle size is 15 micrometers, (b) the average particle size is in the range between 2 and 5 micrometers, (c) the combined amount of ink 12 and particles 13 is in the range between 0.5 and 4 grams/m$^2$ and (d) the mixing ratio of the particles to the binder and coloring agent combined is in the range just mentioned.

Suitable materials for recording sheet 2 include wood free paper, coated paper, artist paper, synthetic paper, or plastic film such as polyethylene terephthlate, polypropylene and cellophane. The surface roughness of the sheet 20 represented by an average value of deviations from a median value is smaller than 1 micrometer, preferably 0.5 micrometers. Experiments showed that it is desirable that recording sheet have a Beck smoothness value of $10^4$ seconds or greater. Thermal tranferability, as represented by the amount of heat applied, can be significantly improved by having the recording sheet coated with a layer of hot melt binder (or a heat seal) capable of mutually dissolving with at least one component of the binder 121. Typically, the amount of heat required to obtain the same result with such coat is about one half the amount of heat otherwise needed. Such hot melt materials on recording sheet 20 may be the same as at least part of the binder 121 and preferably has a melting (softening) point of 60° C. or higher.

For full-color printing purposes, recording sheet 2 may also be provided with inorganic or highpolymer particles embedded in the hot melt coat such that it presents a surface having a desired roughness. Aluminum oxide, calcium carbonate, benzoguanamine resin are particularly advantageous for this purpose. Such particles range in size between 1.5 and 40 micrometers, preferably in the range between 2 and 15 micrometers, and are distributed with a density in the range between $3\times10^2/mm^2$ and $5\times10^4/mm^2$. The hot melt coat on recording sheet 2 is preferably formed of the same material as the binder of the layer that is applied first in a series of full-color prints.

Description will now be concerned with methods by which the thermal ink layer 12 is deposited on base 10.

According to a first method, a mixture of binder 121, coloring agent 122 and particles 13 is fused by heating it to a temperature higher than the melting (softening) or pour point of binder 121 and applied uniformly using a barcoater or the like on the heat resistive base. Liquid solvent is applied over the surface of the coat after it has been cured to remove the surface layer until a desired thickness is attained. This method allows the liquid solvent to be sprayed to the cured coat which is facing downward or the use of a roller having a surface impregnated with such liquid solvent. While the surface removal process may be carried out at normal temperatures, it is preferable to perform it at a temperature higher than normal temperatures but lower than the temperature at which the binder becomes fluidic, particularly in cases where the binder contains a hot melt material undissolvable at normal temperatures, since it ensures uniform thickness and allows precision thickness control by simply adjusting the temperature.

In a second method, a hot melt of ink layer 12 is thinly applied over the base and particles 13 are then uniformly distributed thereover followed by the application of heat under pressure with a roller coated with an unsticky film such as tetrafluoroethylene film which does not adhere to the fused binder but causes it to fuse to allow, the scattered particles to be partially, submerged into the ink layer 12. The particles may be dispersed alternatively by heating the applied coat of layer 12 at a temperature below the fusing point of the binder and passing it through an environment, or furnace containing floating particles 13 to cause the fused layer to further increase its fluidicity and attract some of the floating particles.

In a third method, particles 13 are individually coated with a thin layer of hot melt ink and uniformly scattered over the surface of base 10 and heat is applied to the particles using the unsticky film mentioned above or applied in any manner to fuse to the binder contained in the thin layers.

A fourth method involves the use of a liquid solvent (xylene, for example) having the power of dissolving the binder 121 and dye, if contained, but not dissolving particles 13. To this solvent are added binder, coloring agent and particles, and the mixture is kneaded. To prevent particles 13 from being excessively pulverized during the kneading process, the particles may be added after kneading the liquid mixture without containing the particles. The dispersion prepared in such manner is then applied uniformly to base 10 using a barcoater, or a method employed in offset printing or photogravure printing, known as solvent coating, to a desired wet thickness. The particles settle to the bottom of the applied layer, which is then dried to vaporize the solvent until a desired dry thickness is attained with particles 13 partially emerging from the surface of the layer. By appropriately proportioning the solvent content, the desired dry thickness and the partial emergence of particles 13 can easily be attained. Preferably, the layer is heated during or after the drying process to a temperature higher than the thermally transferable temperature of the binder 121 to melt the layer to allow it to bond firmly to the base 10 and acquire a smooth surface.

This fourth method is further advantageous in that it allows the use of a hot melt material to form the particles 13 although care should be taken to ensure that such hot melt materials do not dissolve in the liquid solvent at normal temperatures and have no power of completely mutually dissolving with the hot melt binder 121. The applied layer is preferably heated to melt the hot melt binder during or after the layer is dried. Similar to the manner referred to above, this heating process allows the layer to bond to base 10 with an increased strength, ensures a smooth surface and fuses any precipitated material which might occur during the drying process if the hot melt binder is composed of different hot melt materials. The temperature involved in this heating process is higher than the thermally transferable temperature of binder 121 but lower than the thermally transferable temperature of the hot melt material of particles 13. Hot melt binder 121 suitable for this method is not necessary a material that dissolves in liquid solvent at normal temperatures. Carnauba wax, sasol wax and ethylene vinyl acetate copolymer resin can be used as the binder.

A fifth method is suitable for using hot melt binder of the material which does not dissolve in the liquid solvent at normal temperatures. In the fifth method, particles 13, hot melt binder materials (at least one of which is particulate at normal temperatures) and a coloring agent are mixed in a liquid solvent and applied on the base 10 to a prescribed thickness. After it is dried or otherwise, the applied coat is heated at a temperature higher than the thermally transferable point of the particulate binder but lower than the thermally trasnsferable point of particles 13 to liquefy the particulate binder component until the layer attains the prescribed thickness T. If the components of hot melt binder are suitably selected, it is possible to produce mutual dissolution between such components. This method is particularly advantageous for forming a layer in which the particles 13 are composed of inorganic material or heat resistive polymer resin such as benzoguanamine.

A sixth method comprises preparing a mixture composed of a normally undissolvable hot melt such as carnauba wax or ethylene vinyl acetate copolymer resin (EVA), and a liquid solvent such as xylene. The mixture is dissolved into a liquid state by application of heat and then cooled at a temperature equal to or lower than normal temperatures while it is agitated. During this cooling process, the hot melt is allowed to precipitate in the form of fine particles in a dispersion. The size of the fine particles is smaller than 5 micrometers. If the hot melt binder is composed exclusively of a material which is not dissolvable at normal temperatures or composed of a mixture of normally dissolvable and normally undissolvable materials, coloring agent 122 and particles 13 are added to the dispersion and applied on base 10 and heated at a temperature higher than the thermally transferable point of the binder but lower than the thermally transferable point of the particles 13 until a desired thickness is attained The coloring agent and particles may also be added to the mixture before the cooling process is carried out. The sixth method compares favorably with the fifth method because it ensures a thermal transfer layer having a highly uniform thickness with particles 13 partially submerged therein.

A seventh method starts with the preparation of a mixture composed of normally undissolvable hot melt components and normally dissolvable hot melt components of binder 121, coloring agent 122, particles 13 and a liquid solvent. The mixture is then heated to completely dissolve the hot melt binder. The base 10 is simultaneously heated to a temperature higher than the thermally transferable point of the hot melt of the mixture. The heated mixture is then applied on the heated base 10 to form a coat of a prescribed thickness. The applied coat is then allowed to vaporize the solvent. The normally undissolvable binder components are uniformly dissolved mutually with other constituents of the binder without any precipitation. A thermal transfer layer of a highly uniform thickness with particles 13 partially submerged in the layer can be obtained.

In the fifth to seventh methods mentioned above, it is desirable that the liquid solvent have a boiling point higher than the thermally transferable point of the normally undissolvable hot melt binder components. This permits the normally undissolvable hot melts to be heated at a temperature higher than their thermally transferable points during the process in which the liquid solvent is vaporized and allows them to mutually dissolve with other constituents of the binder, eliminating the precipitation of the hot melts. Insofar as the above-mentioned temperature is lower than the thermally transferable point of the particles 13, it may be higher than the boiling point of the liquid solvent. Because of the high resistivity to solvent, use of benzoguanamine resin is preferred to prepare the particles 13.

Figure 4:
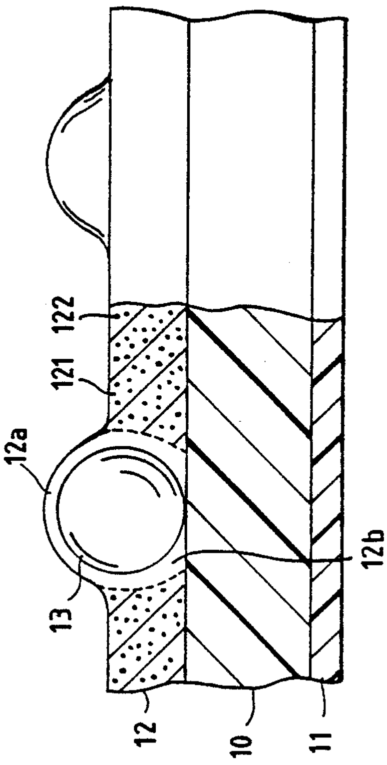
FIG. 4 is an illustration of a second embodiment of the invention in which the auxiliary particles are covered with thin layers of high content hot melt binder.

FIG. 4 is an illustration of a second embodiment of the present invention. This embodiment is an improvement over the FIG. 1 embodiment in that it eliminates undesirable ink transfer which occurs when transfer sheet 1 is pressed tightly against recording sheet 2 before thermal energy is applied. This undesirable transfer is likely to occur if the binder material is soft, i.e., the binder has a high penetration coefficient.

To eliminate the undesirable ink transfer, thin ink layers 12*a* overlying the emerging portions of particles 13 are composed of a material having a smaller content of coloring agent 122 than the content of coloring agent in the bulk of layer 12 or composed exclusively of a binder material. The binder rich thin layers over the emerging portions of particles 13 thus remains nonsticky at normal temperatures before heat is applied.

In addition, fused ink portions 12*b* surrounding the submerged portions of the particles 13 in the form of thin layers are likewise composed of a larger content of binder than the binder content of the bulk of ink present between adjacent particles 13 to take advantage of the temperature-dependent nature of the binder's thermal fusability. This causes the fused ink portions 12*b* to move with greater facility than the bulk of ink layer upon application of heat, thereby improving the density shading and transfer characteristics in response to the application of heat having a relatively low thermal energy.

The high binder-content ink portions 12*a* and 12*b* contains a pigment as the coloring agent. The transfer sheet 1 of FIG. 4 can be formed by depositing a solvent-dissolved dispersion on base 10 and allowing the solvent to vaporize, using any of the solvent coating methods referred to above. Since the wet angle of the ink layer to the surface of the emerging portion of particle 13 is smaller than 90° C. as described previously, there is a tendency to maintain the wet angle constant as the thickness of the layer decreases to thereby produce a pulling force that attracts the fluidic binder in the dispersion to adjacent particles 13. As a result, the binder content of the portions 12*a* and 12*b* is greater than the binder content of the ink portions remote therefrom. The constituents of the ink layer 12 are appropriately proportioned so that the pigment content of the particle-surrounding portions 12*a* and 12*b* can be made negligibly small.

It is thus seen that the solvent coating method is effective for preventing the undesirable ink transfer and improving density shading. If the coloring agent contains both pigment and dyes, the latter, which is confluent with binder, tends to move with it to the particles. This can be avoided by appropriately proportioning the dye content at a small value in relation to other components. A further feature of the invention can be shown that by forming the coloring agent with different colors of pigments and dyes the dyes are made to respond exclusively to a low level of thermal energy while the pigments are made to respond to a higher level of thermal energy. This produces a texture of mixed colors and can be used to provide tint control.

Figure 5:
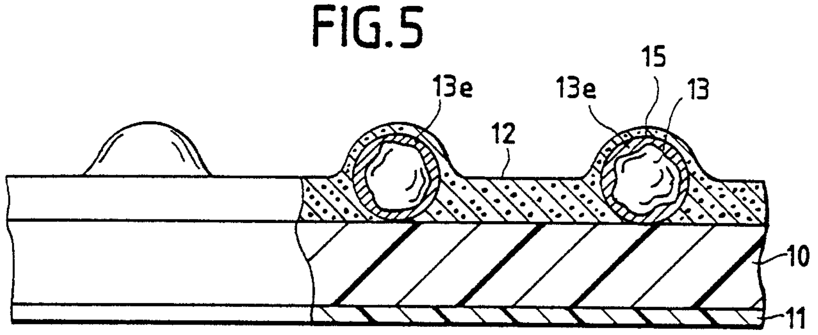
FIG. 5 is an illustration of a third embodiment of the invention in which the auxiliary particles are covered with a thin layer of hot melt material which melts at a temperature lower than the temperature of the hot melt binder of the ink, and in which the particles may be covered with a thin layer of adhesive material by which the particles are transferred with melted ink.

FIG. 5 is a cross-sectional view of a further embodiment of the thermal transfer sheet of the invention. In this embodiment, transfer auxiliary particles 13 are each covered entirely with a thin layer of a polymer material 13*e* to form composite particles 15. The particle covering layer 13*e* is composed of a hot melt material having a lower thermally transferable point than that of the binder 121, so that when temperature rises in layer 12 in response to the application of heat the surface layers 13*e* of the composite particles 15 become fluidic prior to the binder 121 reaching the thermally transferable temperature. The early fusion of surface layers 13*b* allows melts to occur in areas adjacent to particles 13. As a result, particles 13 can be easily transferred to recording sheet. This significantly improves gradation at low optical densities.

It is also advantageous to cover the particles 13 with a hot melt adhesive 13*e* such as ethylene vinyl acetate copolymer (EVA) resin, modified EVA resin or thermosetting material which is solid at normal temperatures such as epoxy resin. Such composite particles have a sufficient power of adhering to the recording sheet immediately when the surrounding portions of ink layer 12 become fluidic upon application of heat to base 10. The surrounding ink portions are thus transferred to the recording sheet 2 with the composite particles even though the particle-covering layers are still in a solid state.

The present embodiment permits the core particles 13 to be composed of pulverized glass or aluminum oxide particles of usually polygonal shape. Thus, the composite particles 15 having a near spherical shape of uniform size and a smooth surface can be easily obtained. It is desirable that the polymer thin layer 13*e* be composed of a transparent, light-colored, or white material.

For particular applications in which gradation at low optical densities can be tolerated, use of a resin having a higher fusing point than that of the binder for particle covering layers 13*e* imparts a high degree of spherity and surface smoothness to the composite particles 15. Polyester or polysulfone is suitable for this type of resin.

For some applications it is desirable to render the auxiliary particles capable of being fused and dispersed uniformly. In such cases, the particle covering layer 13*e* is formed of a dispersing agent such as stearic acid.

The transfer sheet of FIG. 5 can be effectively parepared by a solvent coating method. For this purpose, the fourth method mentioned previously can be advantageously employed using a liquid solvent of the type capable of dissolving with the binder, but not capable of dissolving with the particle covering layer 13*e*.

Figure 6:
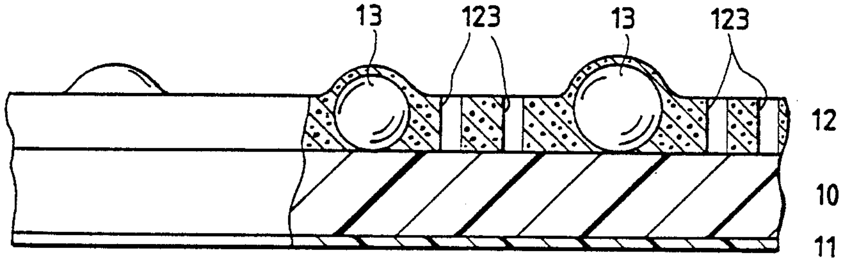
FIG. 6 is an illustration of a fourth embodiment of the invention in which the transferable ink layer is formed with pores that enable melted ink to permeate therethrough.

FIG. 6 is an illustration of a still further embodiment of the thermal transfer sheet of the invention. The ink transfer layer 12 is formed with a multitude of pores 123 extending across the thickness thereof. This allows transferable ink portions to be channeled upward through the pores under the combined effects of their thermal expansion and the capillary action of the pores by amounts corresponding to different levels of applied thermal energy. The channeled ink transfer occurs simultaneously with ink transfer that occurs in regions of adjacent particles 13. These transfer actions combine to produce an improved gradation. This embodiment is particularly advantageous for a transfer sheet in which particles 13 are distributed at a relatively small density and portions of recording sheet 2 are made to pressure contact directly with ink layer 12.

The size of pores 123 is selected so that they allow at least binder material 121 to pass through them, a typical value being greater than 0.1 micrometers. If pigments of the type used in printing are used, the pore size greater than 1.2 micrometers is desirable. In such instances, an average pore size of more than 5 micrometers will facilitate passage of such pigment. For high quality image reproduction, however, the pore size is preferably in the range between 0.1 and 15 micrometers and the porosity is preferably 20% or less.

The solvent coating method mentioned previously in connection with the FIG. 4 embodiment can also be employed to form pores 123 in the ink layer 12. A liquid solvent capable of dissolving the binder 121 and a solvent having no power of dissolving it are mixed with the binder. Controlling the dryness or the rate of evaporation of the solvents regulates the generation of pores in the layer 12.

Figure 7:
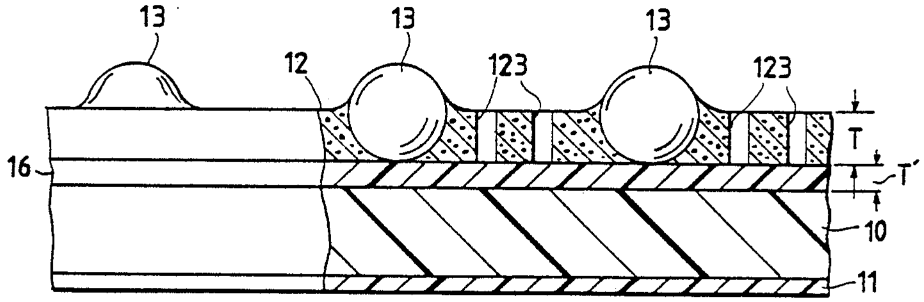
FIG. 7 is an illustration of a fifth embodiment of the invention in which an intermediate layer is provided to serve as a heat conductor to the overlying layer of thermally transferable ink.

As shown in FIG. 7, transfer sheet 1 further includes an intermediate layer 16 interposed between base 10 and ink transfer layer 12. The intermediate layer 16 has a thickness T′ smaller than the thickness T of ink layer 12, a typical value of thickness T′ being smaller than 1.5 micrometers. Intermediate layer 16 is composed of the same material as ink layer 12 but having a thermally transferable point lower than the transferable point of layer 12.

Particles 13 have a size equal to or greater than the combined thicknesses T+T′. Under pressure applied to recording sheet 2, portions of the intermediate layer 16 which are adjacent particles 13 and pores 123 are rendered thermally transferable and moved toward recording sheet.

Intermediate layer 16 also acts as a heat transfer medium and in the process of the displacement it supplies its thermal energy to ink transfer layer 12 to enhance its fluidic mobility. Intermediate layer 16 having the same coloring agent as contained in ink layer 12 improves optical density. If the coloring agent of layer 16 differs from the coloring agent of ink layer 12, the color of deposited image can be made to vary with applied energy. The intermediate layer 16 may also be combined with the thermally transferable layer 12 having no pores therein.

Intermediate layer 16 may be composed of a material having a higher melting point than the binder material 121 such as polyvinylbutyral, ethylcellulose, polyester or polysulfone resin. This improves the adhesive strength between ink layer 12 and base 10.

Intermediate layer 16 can be formed either by the hot melt coating method or solvent coating method. The overlying ink layer 12 with particles 13 therein is formed by the solvent coating method using a solvent having a power insufficient to significantly dissolve the underlying layer 16.

Alternatively, auxiliary particles 13 having the size greater than $T+T'$ are mixed with the material of intermediate layer 16 and the mixture is applied on base 10 so that particles 13 are partially submerged. The material of ink layer 12 is applied using a solvent coating method over the surface of layer 16 from which particles 13 partialy emerge.

Intermediate layer 16 and particles 13 may also be composed of materials having a melting point higher than the transferable point of ink layer 12 to render particles 13 untransferable and render the ink exclusively transferable under applied heat. Although this modification may suffer a reduction both in thermal efficiency and optical density, excellent color purity can be obtained.

Figure 8:
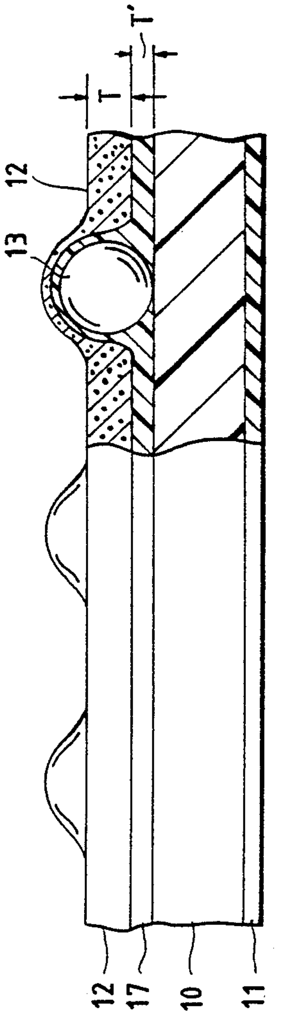
FIG. 8 is an illustration of a sixth embodiment of the invention in which the auxiliary particles are rendered untransferable to recording sheet and act as a heat conductor to enable permeation of melted ink.

A thermal transfer sheet 1 shown in FIG. 8 is useful for improving the color purity of printed ink. This transfer sheet differs from the FIG. 1 embodiment in that it includes a layer 17 of a bonding material in which particles 13 are partially submerged. The layer 17 holds the particles in position when ink is transferred to the recording sheet. A suitable material for bonding layer 17 is polysulfone resinous adhesive which is available under the trademark UDEL Polysulfone P-1700 from Nissan Chemical Industries Limited, the thermally deformable temperature of this adhesive being 175° C. Bonding layer 17 can be formed by mixing the polysufone resinous adhesive with a solution of methylene chloride and particles 13 and applied to base 10 to a thickness T'. The particles 13 are composed of aluminum oxide, glass, or benzoaguanamine or heat resistive polymer material. The methods previously described except for the third method can be used for forming the ink layer 12. Alternatively, the ink layer 12 may be formed by heating the bonding layer 17 and applying the fused ink using a heated coating roller. The fourth to seventh methods are preferred for this purpose.

Figure 9:
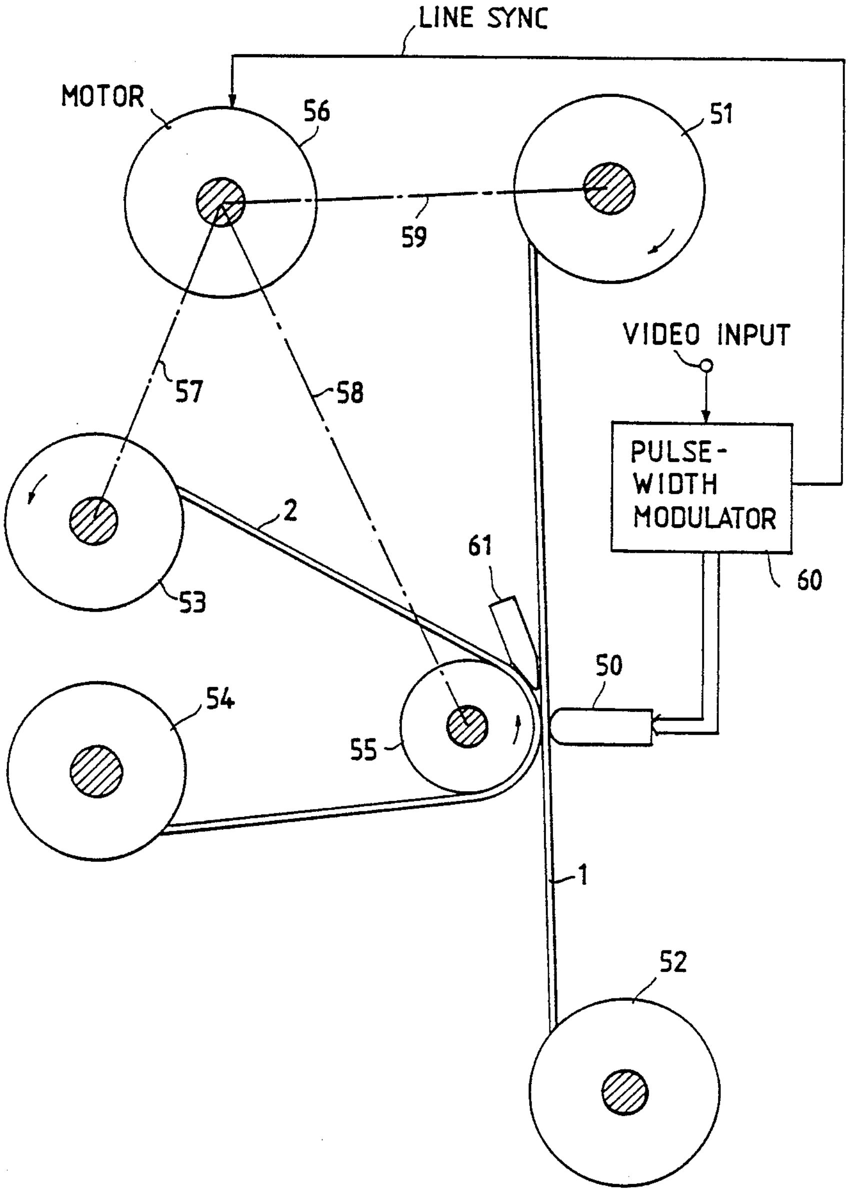
FIG. 9 is an illustration of a thermal printer of the invention for monocolor printing.

FIG. 9 is an illustration of a thermal printer according to the invention.

A thermal head 50 comprises a linear array of 512 of thermal transducers or resistance elements arranged at a density of 4 elements per millimeter. Transfer sheet 1 is supported between takeup reel 51 and supply reel 52 and maintained taut between them. Recording sheet 2 is supported between takeup reel 53 and supply reel 54 and maintained taut therebetween, both sheets being rolled between thermal head 50 and a heat resistive platen 55 which is pressed toward head 50 by a known mechanism. Platen 55, takeup reels 51 and 53 are incrementally rotated by a stepper motor 56 via suitable mechanical linkages 57, 58, 59, so that sheets 1 and 2 are incrementally transported by the width of a print line to takeup reels 51 and 53. A video signal is applied to a pulse width modulator 60 where the input signal is translated into a pulse signal with each pulse having a duration variable in a range between 0 and 4 milliseconds with a resolution of 64 steps (=6 bits). The duration-modulated pulses are stored in a buffer, not shown, and individually fed on a line-by-line basis to the respective transducers of the head 50 in response to a line sync signal with which the motor 56 is synchronized. Depending on the duration of the applied pulses, the transducers raise the temperature of the contact portions of transfer sheet 1.

Recording sheet 2 is disengaged from contact with the transfer sheet 1 before the ink solidifies by means of a separator 61 located downstream with respect to head 50.

If auxiliary particles 13 are formed of a material transferable with melted ink, they act as a spacer to prevent sheets 1 and 2 from being adhered strongly to each other.

Figure 11:
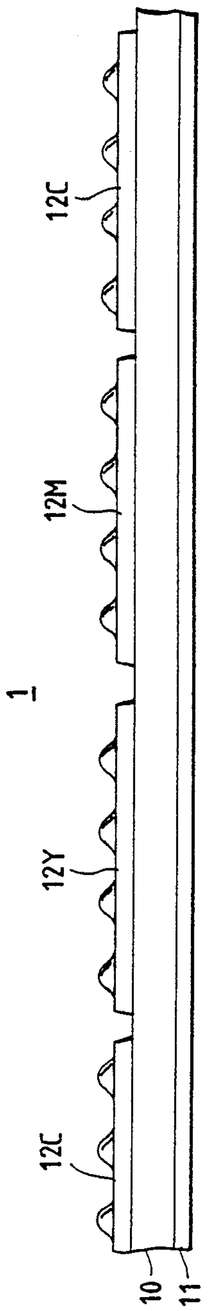
FIG. 11 is an illustration of a thermal transfer sheet for use in full-color printing.

For color printing, transfer layer 12 comprises a series of portions of different colors indicated at 12C, 12M and 12Y (for cyan, magenta and yellow, respectively) which are successively arranged in a recyclic pattern on base 10 as shown in FIG. 11.

Figure 12:
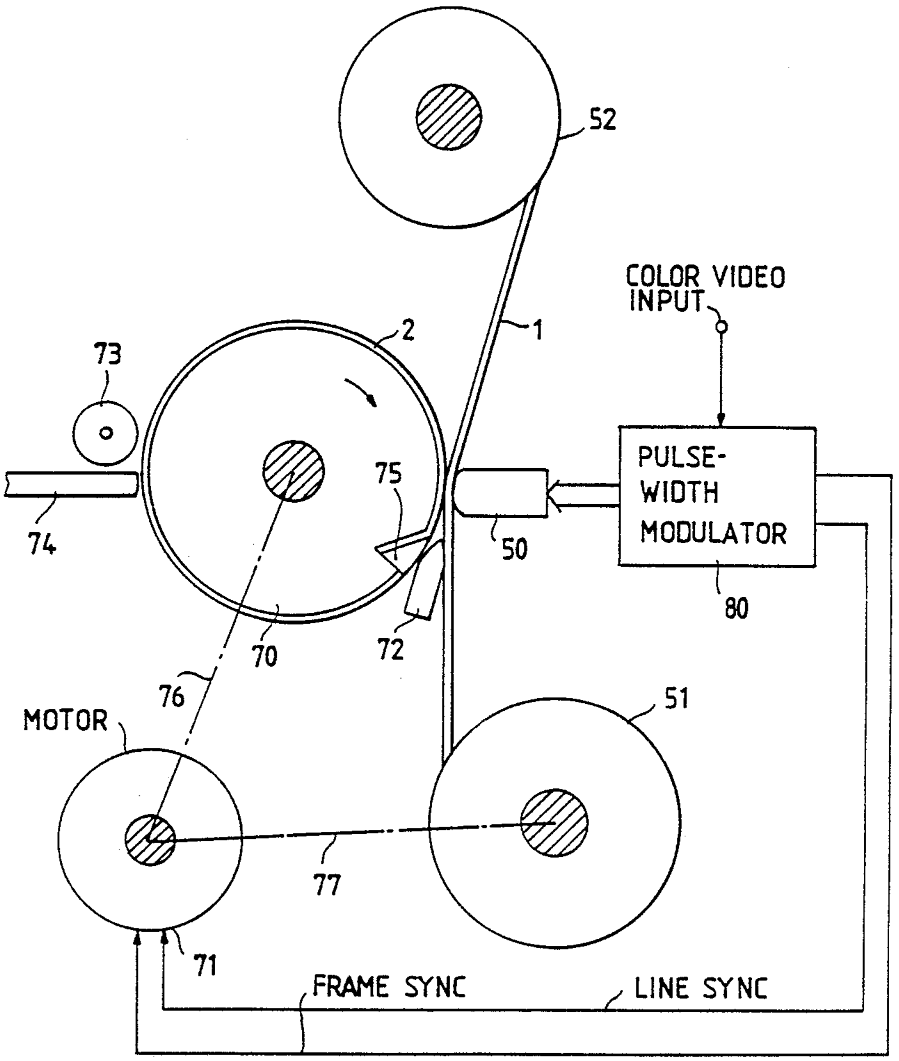
FIG. 12 is an illustration of a color thermal printer of the invention.

FIG. 12 is an illustration of a thermal color printer of the invention which operates with the transfer sheet of FIG. 11. This embodiment is similar to the printer of FIG. 9 with the exception that recording sheet 2 is sized paper and is fed between roller 73 and feeding plate 74 to a platen 70. Platen 70 includes a slot 75 which holds one end of recording sheet to wrap it over the surface of platen as it rotates clockwise. Suitable means are provided to hold the other end of the sheet in position. Stepper motor 71 drives the platen by a linkage 76 in response to the line sync pulse over the length of a predetermined area of the precut sheet. Color transfer sheet 1 is transported to the takeup reel 51 by motor 71 via linkage 77 in step with platen 70 during the time when the transfer layer of each color is printed. Linkages 76 and 77 are constructed so that at the end of each print cycle, the takeup reel 51 and platen 70 are rotated individually to advance the header portions of the next color-print layer of sheet 1 and the recording sheet to the print position. The process is repeated to transfer dots of different colors on the same recording sheet on a frame-by-frame basis. As in the previous embodiment, separator 72 is provided to separate the transfer sheet 1 forcibly from recording sheet 2 before the ink solidifies.

Mechanical linkage 76 may include a means for providing a pressure on platen 70 when print operation is carried out. Color video signal is sampled to provide a freeze-frame signal including cyan, magenta and yellow frames. These frames are sequentially supplied to a pulse width modulator 80 and converted to variable duration pulses with a resolution of 64 steps, these pulses being stored in a buffer and fed in response to line sync to thermal head 50. Pulse-width modulator 80 supplies a frame sync signal to motor 71 to set the sheets to proper position to repeat the print cycle.

Figure 13:
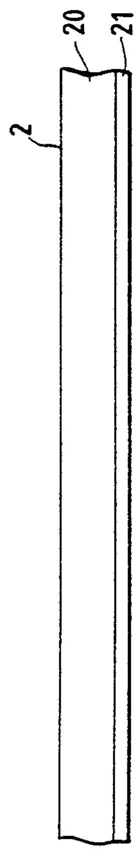
FIGS. 13 and 14 are illustrations of the recording sheet of the invention.

It is desirable that recording sheet 2 comprises a base sheet 20 and a layer 21 coated on base 20 as shown in FIG. 13. The layer 21 is composed of a hot melt adhesive such as ethylene vinyl acetate (EVA) copolymer resin or modified EVA copolymer resin, or thermosetting material of the type which is solid at normal temperatures. Suitable thermosetting material is epoxy resin. Auxiliary particles 13 adhere to the sticky surface of the recording sheet 2 and forcibly pulled away from the fused ink. Improvement can be achieved by this coating in gradation, optical density and sensitivity characteristics. This coating also renders the recording sheet capable of retaining a constant ink holding power during successive cycles so the overlying prints can stick to sheet 21 with sufficient strength to the underlying In a further preferred form of the invention, recording layer sheet 20 is a plastics material such as propylene synthetic paper and the layer 21 is made of a hot melt material such as alicyclic saturated hydrocarbon resin (ARCON P-125, Arakawa Chemical Industries Ltd.) with a surface roughness of 0.8 micrometers as measured in terms of the average value of deviations from a center line. The hot melt material of layer 21 is capable of mutually dissolving with the hot melt binder 121 of transfer sheet 1. This coating renders the recording sheet more sensitive to the melted ink. A full-color print was experimentally recorded by pulses having a duration varying in the range between 0 and 2 milliseconds.

Figure 14:
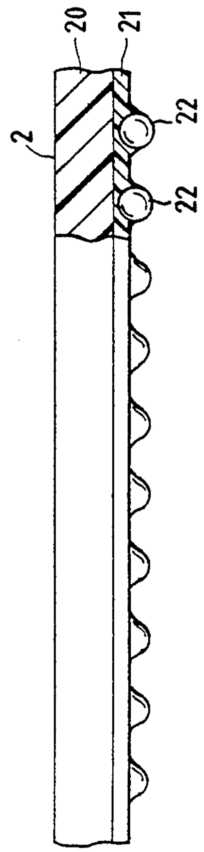

While the spacer action of auxiliary particles 13 plays an important role in achieving successful full-color printing, it is further desirable to distribute particles in the hot melt layer 21 of material just mentioned, as shown in FIG. 14. In a manner similar to the transfer sheet, particles 22 having an average size of 3 micrometers (the maximum being 15 micrometers) are distributed in and partially emerged from the hot melt layer 21 of alicyclic saturated hydrocarbon resin (ARCON P-125). Suitable material for particles 22 is aluminum oxide, calcium carbonate or benzoguanamine resin, or a mixture thereof, which can be mixed with the above-mentioned hot melt with weight-percent ratios of 100:100, 100:50 and 100:25, respectively. This embodiment enables the color-print recording sheet to trap ink dots in a more facile manner.

The following are practical examples for manufacturing the thermal transfer sheet of the present invention. The average particle sizes given below are represented by median values and the maximum particle size is 15 micrometers.

EXAMPLE 1

Figure 10:
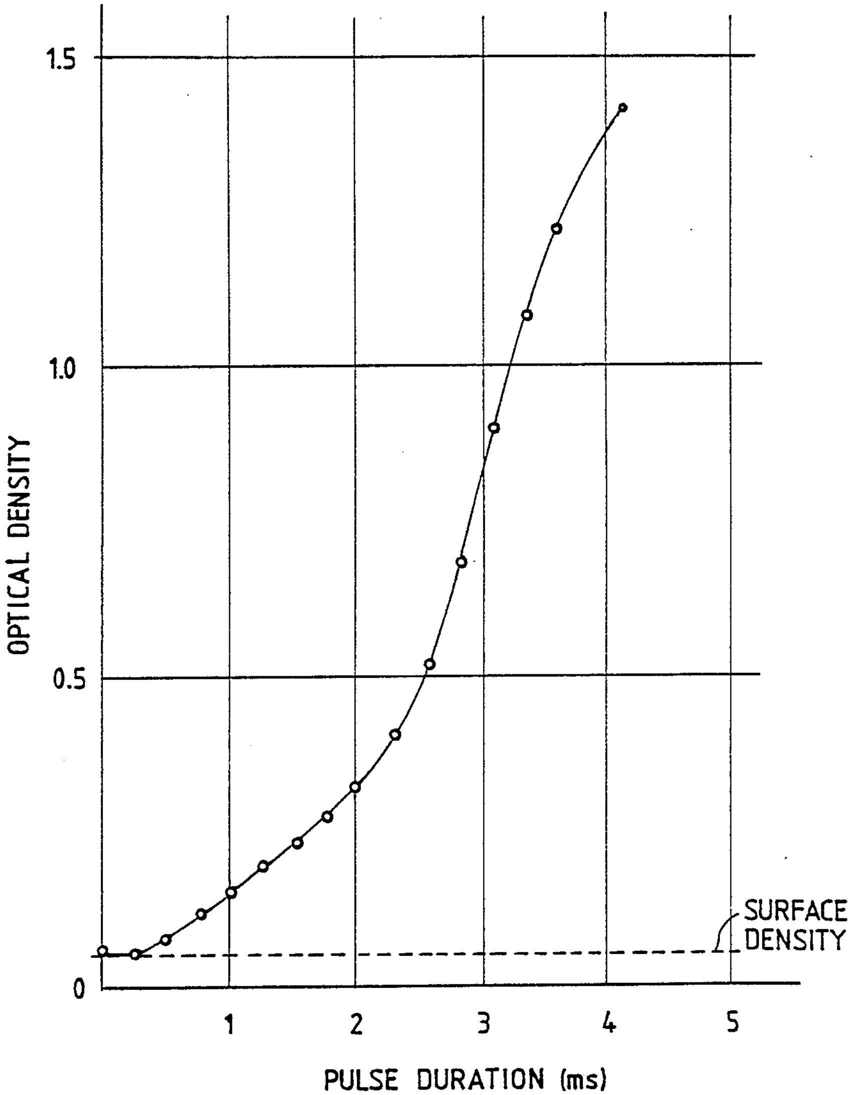
FIG. 10 is a graphic illustration of the optical density versus variable pulse duration.

50 parts by weight of alicyclic saturated hydrocarbon resin (ARCON P-70, Arakawa Chemical Industries Ltd.) having a softening point of about 70° C. and 20 parts by weight of solid paraffin having a melting point of 50° to 52° C. as a binder material 121, 30 parts by weight of carbon black as the coloring agent 122, 2.5 parts by weight of a dispersing agent and 100 parts by weight of aluminum oxide ($Al_2O_3$) particles having an average particle size of 3 micrometers were mixed in a xylene solvent of 400 parts by weight and kneaded to obtain a dispersion. This dispersion was applied onto the surface of base 10 using a commercially available No. 3 barcoater to form a layer. About 1.6 grams/m$^2$ of thermal ink was deposited on base 10. The layer was then dried to vaporize the xylene solvent so that it attains a dry thickness of about 3 micrometers was attained. The density of particles 13 was about $10^4$/mm$^2$. FIG. 10 is a graphic illustration of the relationship experimentally obtained between the optical density of ink dots and pulse duration With an increase i pulse duration the optical density increases gradually from the reference optical density of the surface of recording sheet 2. This indicates that an image of satisfactory continuous tone gradation can be obtained.

EXAMPLE 2

30 parts by weight of cyan pigment (CI pigment blue 15) was used as the coloring agent instead of the carbon black of Example 1 and 30 parts by weight of dissolved silica particles having an average particle size of 3 micrometers were added instead of $Al_2O_3$ particles. 1 part by weight of dispersing agent was added to obtain a thermal transfer layer with a dry thickness of about 3 micrometers. The thermal transfer sheet prepared in this way showed an excellent density shading for a range of input pulse durations of 0 to 4 milliseconds similar to that shown in FIG. 10.

EXAMPLE 3

Using the dispersion of Example 2 with the exception that 30 parts by weight of yellow pigment (CI pigmenet yelllow 12) was added instead of the cyan pigment to obtain a 3-micrometer thick thermal transfer sheet 1. A similar result to that shown in FIG. 10 was obtained for pulse durations of 0 to 4 milliseconds.

EXAMPLE 4

Using the dispersion of Example 2 with the exception that 30 parts by weight of magenta pigment (CI pigment red 57:1) was added instead of the cyan pigment to obtain a 3-micrometer thick thermal transfer sheet 1. The same result was obtained as in FIG. 10 for pulse durations of 0 to 4 milliseconds.

EXAMPLE 5

Using the dispersion of Example 2 with the exception that 30 parts by weight of magenta pigment (CI pigment red 57:1) was added instead of the cyan pigment to obtain a 3-micrometer thick thermal transfer sheet 1. Transfer sheet 1 was heated to 120° C. to melt the hot melt binder. The resulting layer aquired a smooth surface and a firm bonding to base 10. The same result was obtained as in FIG. 10 for pulse durations of 0 to 4 milliseconds.

EXAMPLE 6

Using the dispersion of Example 2 with the exception that transfer auxiliary particles comprised 25 parts by weight of carnauba wax particles having an average particle size of about 5 micrometers (melting point being about 83° C.) and 12.5 parts by weight of dissolved silica particles having an average particle size of approximately 5 micrometers. The dispersion was applied on the base using a commercially available No. 5 barcoater and dried to obtain a dry thickness of about 5 micrometers. Similar result was obtained to that shown in FIG. 10 for pulse durations of 0 to 4 milliseconds.

It is noted that at normal temperatures carnauba wax does not dissolve in a xylene solvent and therefore does not dissolve in the binder materials as used in Examples 1 and 2. Therefore, if the solvent coating method is performed at normal temperatures, carnauba wax can form particles 13 of a hot melt type having a melting point higher than the transferable temperature of the binder 121. With the application of longer duration pulses, such hot melt particles dissolve in or mutually dissolve with the binder. This improves ink transfer and adhesion characteristics.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A thermal printer comprising:

heating means for generating heat in response to an input signal applied thereto;

first support means movably supporting a recording sheet and providing a pressure on said recording sheet in a direction toward said heating means;

second support means movably supporting a thermal transfer sheet in contact with said heating means, said thermal transfer sheet comprising a heat resistive base, a thermally transferable ink layer on one side of said base, said layer comprising a mixture of a coloring agent and a hot melt binder, the mixture being transferable to said recording sheet in response to application of heat to the other side of said base, and auxiliary particles distributed in said layer so that they partially emerge from the surface of said layer;

means for moving said first and second supporting means; and means located downstream with respect to said heating means for separating said transfer and recording sheets from each other before the heated mixture solidifies.

2. A thermal printer comprising:

heating means for generating heat in response to an input signal applied thereto;

first support means movably supporting a recording sheet, said recording sheet having a surface roughness represented by an average value of deviations from a center line, said average value being 0.8 micrometers or less and providing a pressure on said recording sheet in a direction toward said heating means;

second support means movable supporting a thermal transfer sheet, said thermal transfer sheet comprising a heat resistive base, a thermally transferable ink layer on one side of said base, said ink layer comprising a mixture of a coloring agent and a hot melt binder, the mixture being transferable to said recording sheet in response to application of heat to the other side of said base, and auxiliary particles dispersed in said layer so that they partially emerge from the surface of said layer; and means located down stream of said heating means for separating said transfer sheet and said recording sheet from each other before the heated mixture solidifies.

3. A thermal printer as claimed in claim 2, wherein said transferable layer of the transfer sheet comprises a series of separate portions containing the coloring agents of cyan, magenta and yellow arranged in a recyclic pattern on said base in the direction of movement of the transfer sheet, wherein said moving means comprises means for feeding said recording sheet repeatedly past said heating means to provide a color print on the recording sheet.

4. A thermal printer as claimed in claim 2, wherein said feeding means comprises a cylindrical body, means for holding said recording sheet on the circumference of said body and means for rotating said body in relation to the movement of said transfer sheet.

5. A thermal printer as claimed in claim 2, further comprising a pulse width modulator for converting said input signal into variable duration pulses and applying the pulses to said heating means.

6. A thermal printer comprising:

heating means for generating heat in response to an input signal applied thereto;

first support means movably supporting a recording sheet and providing a pressure on said recording sheet in a direction toward said heating means;

second support means movable supporting a thermal transfer sheet, said thermal transfer sheet comprising a heat resistive base, a thermally transferable ink layer on one side of said base, said ink layer comprising a mixture of a coloring agent and a hot melt binder, the mixture being transferable to said recording sheet in response to application of heat to the other side of said base, and auxiliary particles dispersed in said ink layer so that they partially emerge from the surface of said ink layer, said recording sheet having on one surface thereof a coat capable of mutually dissolving with the hot melt binder of said transfer sheet; and means located down stream of said heating means for separating said transfer sheet and said recording sheet from each other before the heated mixture solidifies.

7. A thermal printer as claimed in claim 6, wherein said recording sheet includes particles dispersed in said coat which is capable of mutually dissolving with the hot melt binder of said transfer sheet and partially emerging from the surface of the coat.

8. A thermal printer as claimed in claim 7, wherein the particle size of the last-mentioned particles is in the range between 1.5 micrometers and 40 micrometers and the density of the last-mentioned particles in the range between $3\times10^2$/mm$^2$ and $5\times10^4$mm$^2$.

9. A thermal printer comprising:

heating means for generating heat in response to an input signal applied thereto;

first support means movably supporting a recording sheet having an adhesive coat and providing a pressure on said recording sheet in a direction toward said heating means;

second support means movably supporting a thermal transfer sheet, said thermal transfer sheet comprising a heat resistive base, a thermally transferable ink layer on one side of said base, said layer comprising a mixture of a coloring agent and a hot melt binder, the mixture being transferable to said recording sheet in response to application of heat to the other side of said base, and auxiliary particles dispersed in said layer so that they partially emerge from the surface of said layer;

means located down stream of said heating means for separating said transfer sheet and said recording sheet from each other before the heated mixture solidifies.

10. A thermal printer as claimed in claim 9, wherein said adhesive coat is a hot melt.

11. A thermal printer as claimed in claim 9, wherein said adhesive coat is a thermosetting resin.

* * * * *